(12) United States Patent
Makke et al.

(10) Patent No.: US 9,879,727 B2
(45) Date of Patent: Jan. 30, 2018

(54) TWO LIP SEAL

(71) Applicant: Schaeffler Technologies AG & Co. KG, Herzogenaurach (DE)

(72) Inventors: Alaa Makke, Farmington Hills, MI (US); Michael Claassen, Bruce Township, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 45 days.

(21) Appl. No.: 14/988,224

(22) Filed: Jan. 5, 2016

(65) Prior Publication Data
US 2017/0191529 A1    Jul. 6, 2017

(51) Int. Cl.
*F16C 33/78* (2006.01)
*F16C 19/46* (2006.01)

(52) U.S. Cl.
CPC ........ *F16C 33/7823* (2013.01); *F16C 19/463* (2013.01); *F16C 33/7809* (2013.01); *F16C 2360/22* (2013.01)

(58) Field of Classification Search
CPC .............. F16C 33/7869; F16C 33/7876; F16C 33/7873; F16C 33/7823; F16C 33/7809
See application file for complete search history.

(56) References Cited

U.S. PATENT DOCUMENTS

| | | | |
|---|---|---|---|
| 3,447,848 A * | 6/1969 | Pitner | F16C 19/466 277/551 |
| 3,510,182 A | 5/1970 | Cowles | |
| 3,572,857 A * | 3/1971 | Hasegawa | F16C 33/7856 277/348 |
| 7,258,490 B2 * | 8/2007 | Peschke | F16C 21/005 384/485 |
| 8,262,291 B2 | 9/2012 | Akamatsu et al. | |
| 8,827,563 B2 * | 9/2014 | Tate | F16C 33/768 384/477 |
| 2009/0317031 A1 * | 12/2009 | Pfundt | F02D 9/04 384/569 |
| 2010/0322544 A1 * | 12/2010 | Hubbard | F16C 33/7853 384/478 |
| 2014/0177992 A1 * | 6/2014 | Schaefers | F16C 33/7809 384/486 |

* cited by examiner

*Primary Examiner* — Thomas R Hannon
(74) *Attorney, Agent, or Firm* — Simpson & Simpson, PLLC

(57) ABSTRACT

A seal for a bearing assembly, including: a longitudinal axis; a first portion arranged to engage an outer ring for the bearing assembly; and a second portion extending radially inward and in a first axial direction from the first portion. The second portion includes: a first lip arranged to contact a rotatable shaft passing through the bearing assembly; and a second lip located past the first lip in a second axial direction, opposite the first axial direction, and arranged to be separated, in a radial direction, from the rotatable shaft by a first distance.

16 Claims, 5 Drawing Sheets

TWO LIP SEAL

TECHNICAL FIELD

The present disclosure relates broadly to a seal for a bearing assembly. More particularly, the present disclosure relates to a two lip seal for a bearing assembly.

BACKGROUND

FIG. 5 illustrates prior art throttle valve bearing 20 including single-lipped seals 22 used to create a seal with shaft S, and needle bearings 23. Seals 22 are designed to prevent particulate from jamming the valve and causing the engine to seize. Typically, seals for throttle valve bearing assemblies are designed to withstand pressure peaks that originate from the fuel combustion chamber. Multiple stacked seals can be used to accommodate the pressure peaks; however, stacking seals requires additional axial space. In throttle body applications, a minimum needle bearing length is required to minimize the risk of other failure modes. However, the axial space available for the seals and for the needle bearings is limited. Thus, the desire to use axial space for stacking multiple seals is at odds with the desire to minimize axial space to accommodate packaging restrictions.

SUMMARY

According to aspects illustrated herein, there is provided a seal for a bearing assembly, including: a longitudinal axis; a first portion arranged to engage an outer ring for the bearing assembly; and a second portion extending radially inward and in a first axial direction from the first portion. The second portion includes: a first lip arranged to contact a rotatable shaft passing through the bearing assembly; and a second lip located past the first lip in a second axial direction, opposite the first axial direction, and arranged to be separated, in a radial direction, from the rotatable shaft by a first distance.

According to aspects illustrated herein, there is provided a bearing assembly, including: an axis of rotation; an outer ring; a cage located within the outer ring; a plurality of rolling elements axially retained by the cage and in contact with the outer ring; and a seal aligned with the cage in a first axial direction. The seal includes: a first portion in contact with the outer ring; and a second portion extending radially inward and in a first axial direction from the first portion and including a first lip arranged to contact a rotatable shaft and a second lip arranged to contact the rotatable shaft and located past the first lip in a second axial direction, opposite the first axial direction.

According to aspects illustrated herein, there is provided a seal for a bearing assembly, including: a longitudinal axis; a first portion arranged to engage an outer ring for the bearing assembly; and a second portion including first and second surfaces. The first surface has a first inner diameter, and is arranged to contact a rotatable shaft passing through the bearing assembly. The second surface has a second inner diameter, larger than the first inner diameter, and is arranged to contact the rotatable shaft.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
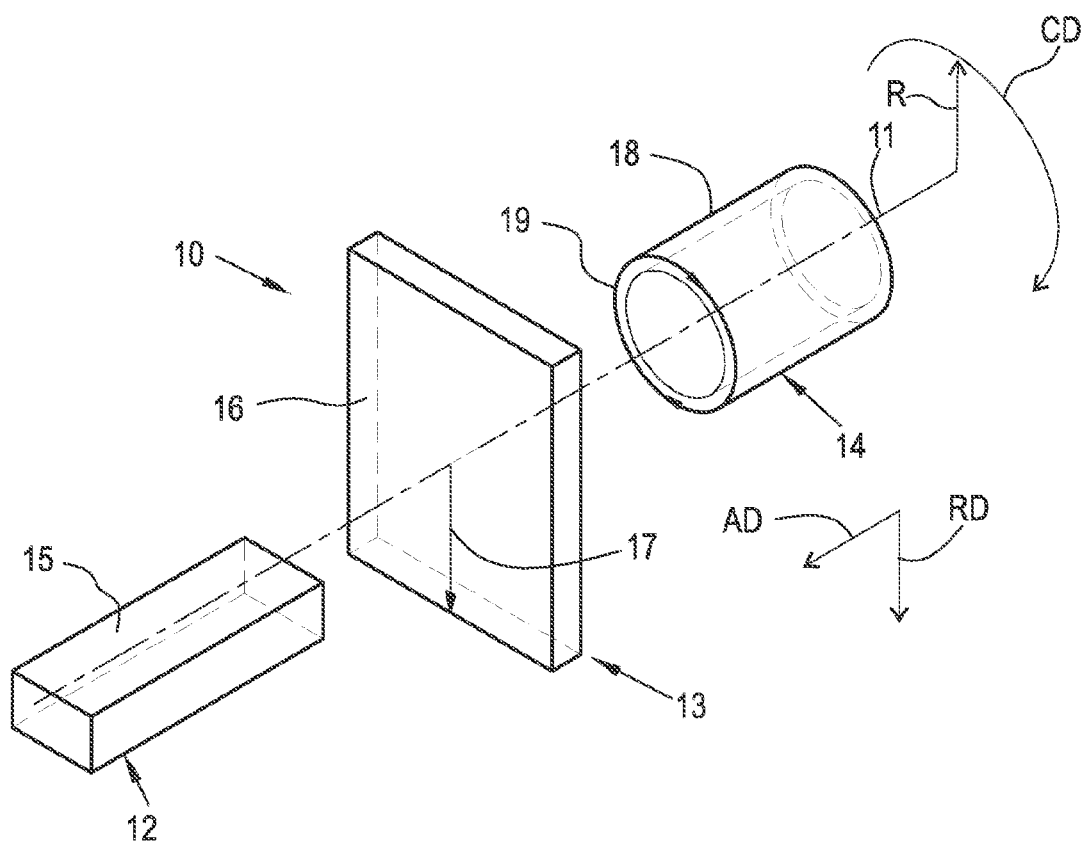
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane parallel to axis 11. Axis 11 is coplanar with planar surface 15; however it is not necessary for an axial surface to be coplanar with axis 11. A radial surface, such as surface 16 of object 13, is formed by a plane orthogonal to axis 11 and coplanar with a radius, for example, radius 17. Surface 18 of object 14 forms a circumferential, or cylindrical, surface. For example, circumference 19 forms a circle on surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively.

Figure 2:
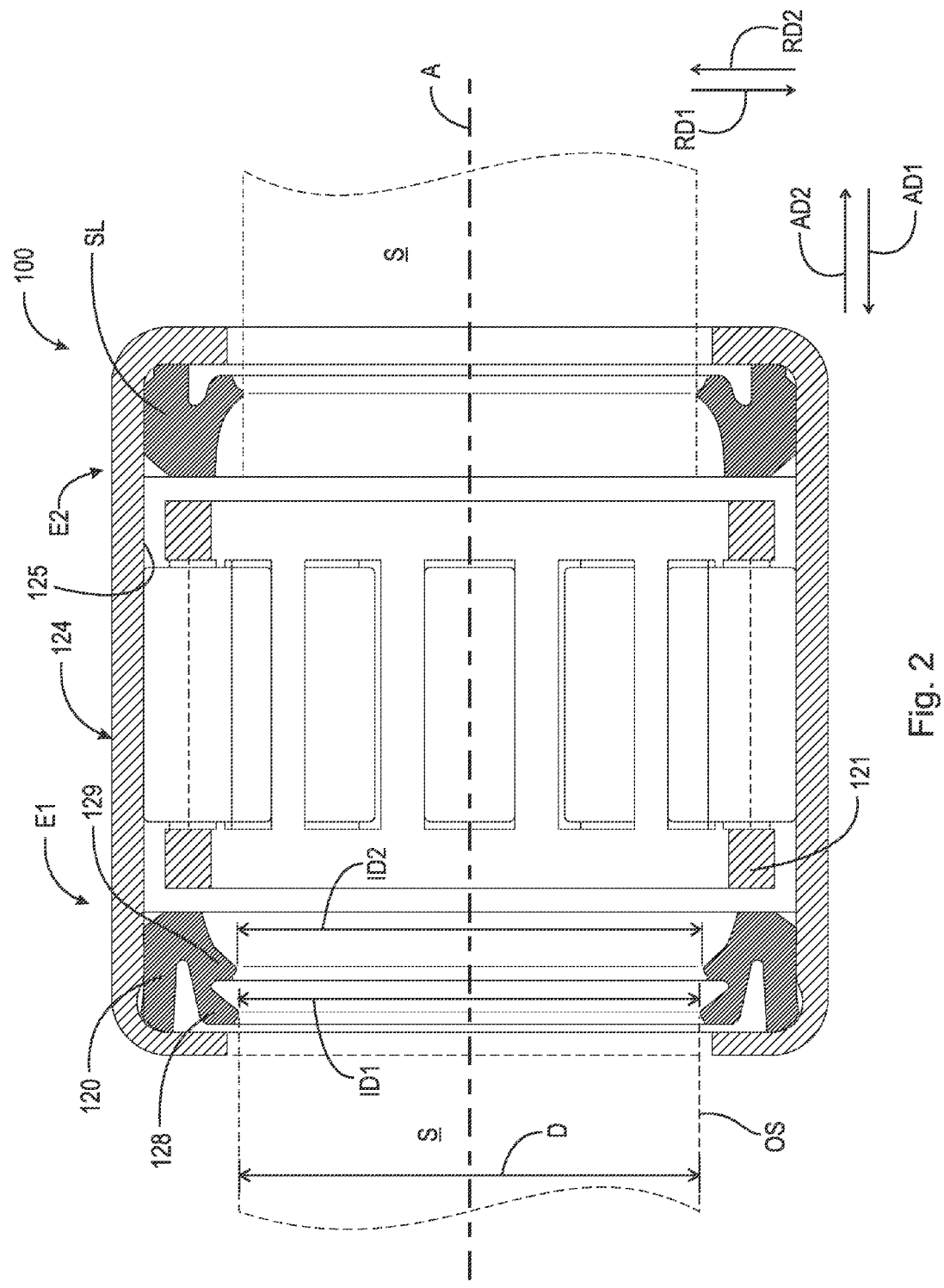
FIG. 2 is a cross-sectional view of a bearing assembly including a double-lipped seal.

FIG. 2 is a cross-sectional view of bearing assembly 100 including double-lipped seal 120.

Figure 3:
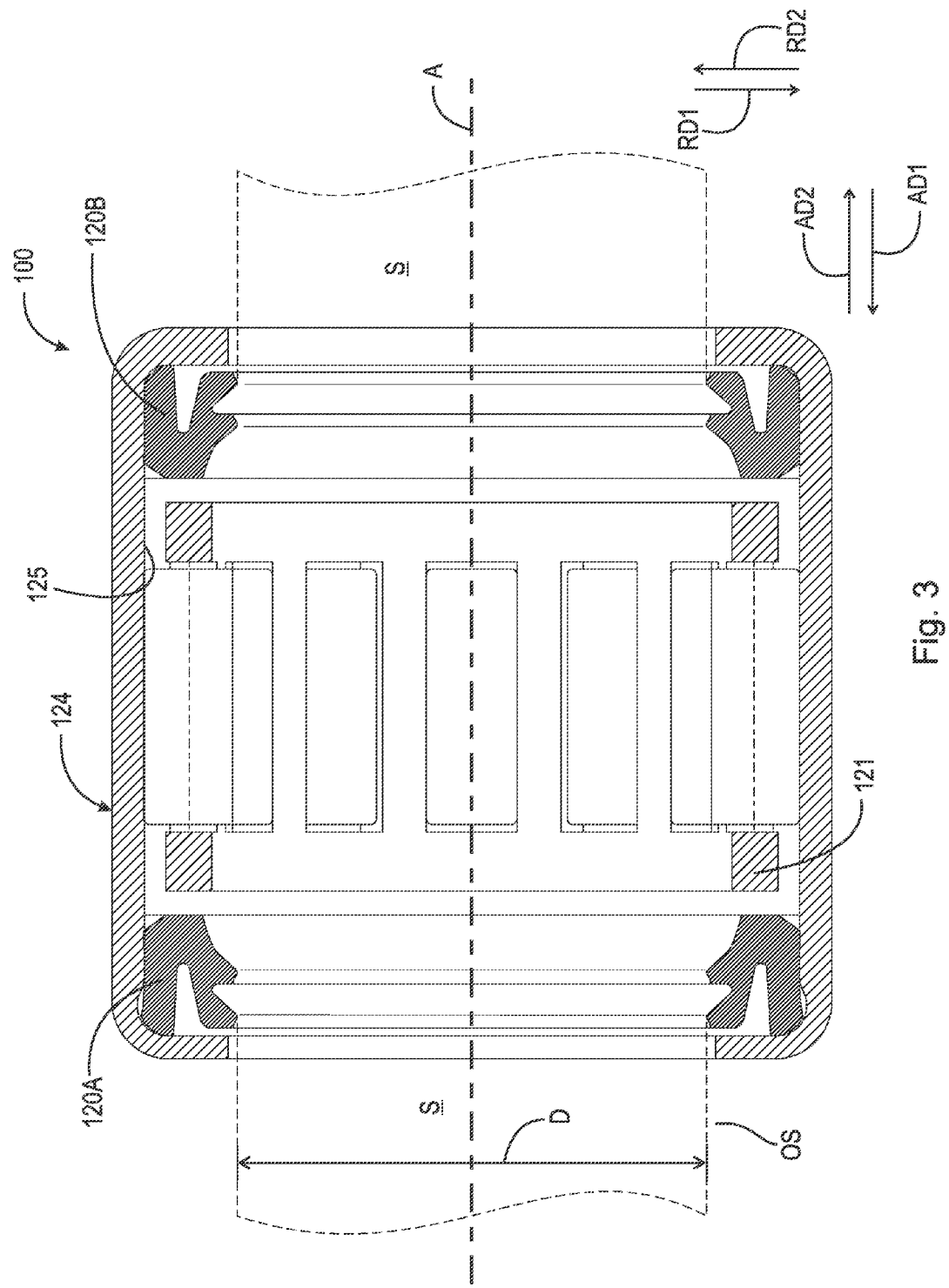
FIG. 3 is a cross-sectional view of a bearing assembly including two double-lipped seals.

FIG. 3 is a cross-sectional view of bearing assembly 100 including double-lipped seals 120A and 120B.

Figure 4:
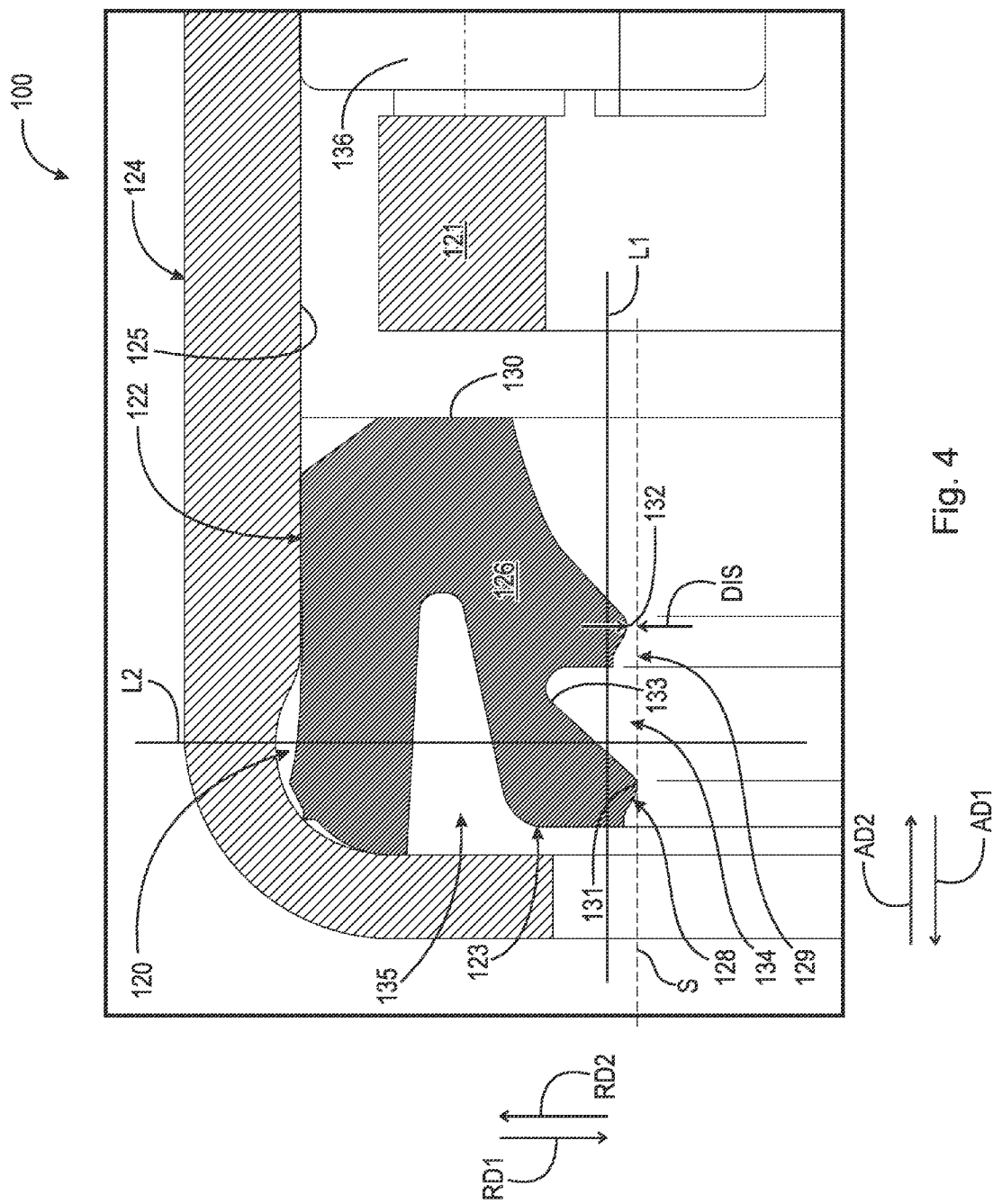
FIG. 4 is a detail of the double-lipped seal shown in FIG. 2.
Figure 5:
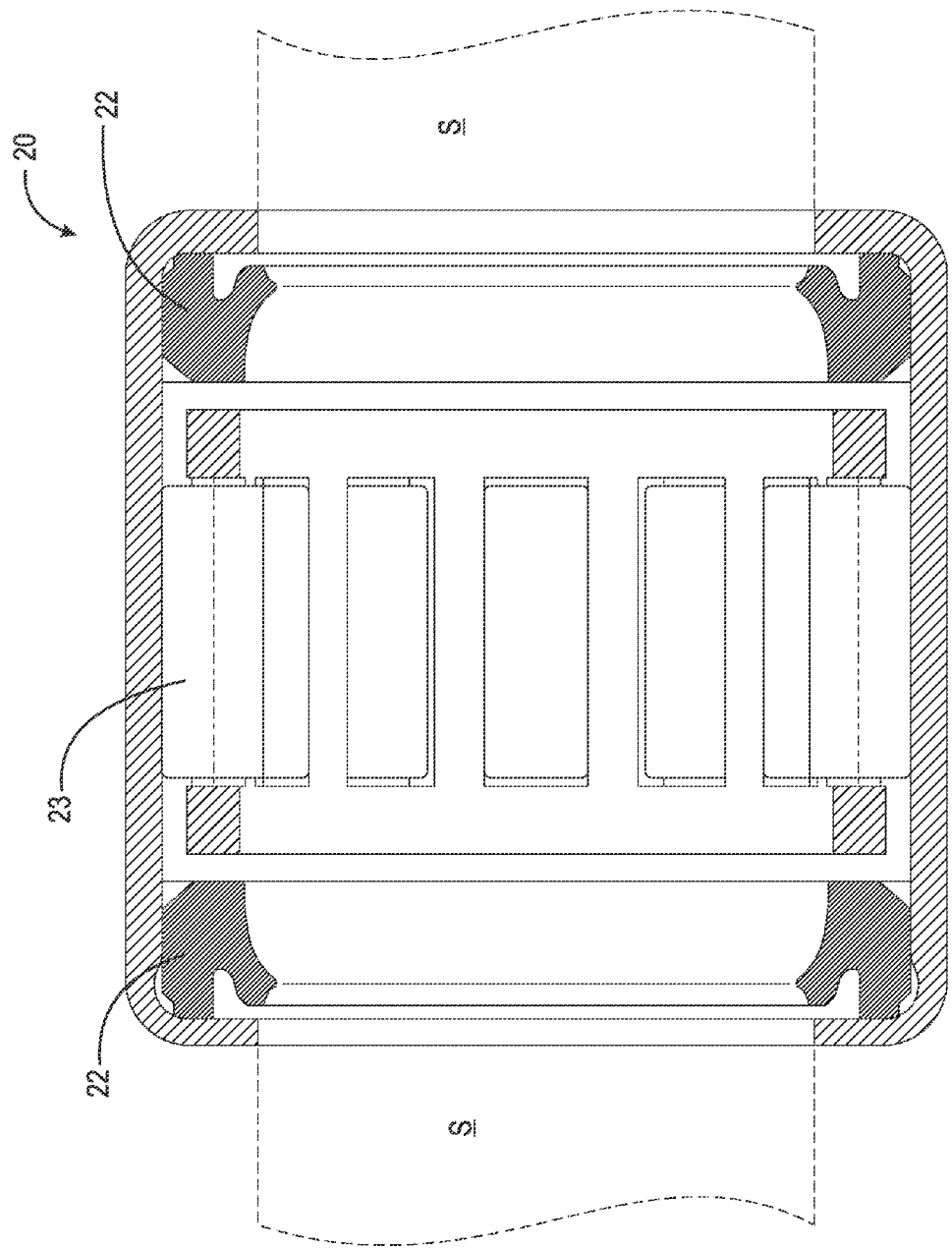
FIG. 5 is a cross-sectional view of a prior art throttle valve bearing including two single-lipped seals.

FIG. 4 is a detail of double-lipped seal 120 shown in FIG. 2. The following description of seal 120 equally applies to seals 120A and 120B shown in FIG. 3. Thus, the following should be viewed in light of FIGS. 2 through 4. Seal 120 for bearing assembly 100 includes longitudinal axis A, and portions 122 and 123. Portion 122 is arranged to engage outer ring 124 of bearing assembly 100, in particular, radially inner surface 125 of ring 124. Portion 123 extends radially inward in direction RD1 and in axial direction AD1 from portion 122. Portion 123 includes lips 128 and 129. Upon initial installation about rotatable shaft S, (shown in broken lines) passing through bearing assembly 100, lip 128 is arranged to contact shaft S. As shown in FIG. 4, upon initial installation about shaft S, lip 129 is separated from shaft S by distance DIS in radial direction RD2. Seal 120 is a unitary annular member, that is, seal 120 is formed of one single piece of material.

Contact of portion 122 with outer ring 124 is arranged to fix seal 120 with respect to outer ring 124. Surface 130 of seal 120 connects portions 122 and 126, forms a part of seal 120 that extends furthest in axial direction AD2, and is arranged to contact cage 121 of bearing assembly 100. Lip 128 includes surface 131 and lip 129 includes surface 132. Surfaces 131 and 132 form part of a continuous surface, for example, surface 133 connects surfaces 131 and 132 and is located radially outward of surfaces 131 and 132 in radial direction RD2.

Slot 134 is located axially between lips 128 and 129 and opens in radial direction RIM. Line L1, parallel to axis A, passes through in sequence and in direction AD2: lip 128, slot 134 and lip 129. Slot 135 is located radially between portions 122 and 123 and opens in axial direction AD1. Line L2, orthogonal to axis A, passes through in sequence and in direction RD2: portion 123, slot 135 and portion 122.

Bearing assembly 100 includes rolling elements 136. Rolling elements 136 are axially retained by cage 121 and in contact with outer ring 124. Seal 120 is aligned with cage 121 in axial direction AD1 or AD2. In an example embodiment, rolling elements 136 are needle bearings; however, it should be understood that other types of rolling elements are possible.

In an example embodiment: upon initial insertion of shaft S through bearing assembly 100, surface 131 has inner diameter ID1 and surface 132 has inner diameter ID2 greater than diameter ID1; and shaft has diameter D equal to diameter ID1 and less than ID2. Thus, upon initial insertion of shaft S through bearing assembly 100, surface 131 is in contact with outer surface OS of the shaft, while as noted above, surface 132 is separated from surface OS by distance DIS.

As shaft S rotates, contact between surfaces 131 and OS wears away material forming surface 131, which increases diameter ID1. When shaft S rotates a sufficient number of times, diameter ID1 is reduced to diameter ID2 and surface 132 contacts surface OS.

In an example embodiment, bearing assembly 100 is for a throttle valve. When the engine including the throttle valve is in operation, air, or fluid, pressure is applied at end E1 of bearing assembly 100 and in axial direction AD2, in particular, on slot 135 and portion 123 urges lip 128 into further compressive engagement with shaft S, strengthening the seal formed between surfaces 131 and OS. When lip 128 and surface 131 have worn a sufficient amount due to contact between surface 131 and outer surface OS, lip 129 and surface 132 contact surface OS. The air pressure may begin by bypass surface 131 to urge surface 132 into contact with outer surface OS with increasing force, strengthening the seal formed between surface 132 and outer surface OS of the shaft.

Seal 120 can be made of any material known in the art, including, but not limited to rubber or any suitable elastic alternative capable of providing an airtight seal between bearing assembly 100 and shaft S. In an example embodiment, seal 120 is made of an elastic material that is heat and chemical resistant, for example, a fluoroelastomer (FKM). Other suitable elastomers are contemplated, such as, neoprene or nitrile rubber.

In the example embodiment of FIG. 2, bearing assembly 100 includes double-lipped seal 120 on axial end E1 and single lipped seal SL on axial end E2. In the example embodiment of FIG. 3, bearing assembly 100 includes double-lipped seal 120A on axial end E1 and double-lipped seal 120B on axial end E2. In an example embodiment (not shown), bearing assembly 100 includes two double-lipped seals 120 on one or both axial ends E1 and E2. Any number of double-lipped seals 120 can be used in bearing assembly 100.

In an example embodiment, bearing assembly 100 is a drawn cup needle roller bearing having an outer ring formed of a thin steel plate.

The following describes a method of sealing a bearing assembly using a seal formed of a single piece of material. Although the method is presented as a sequence of steps for clarity, no order should be inferred from the sequence unless explicitly stated. A first step involves engaging a first portion of the seal with an outer ring for the bearing assembly. A second step involves contacting a first lip for the seal with a rotatable shaft. A third step involves disposing a second lip for the seal radially about the rotatable shaft and separating the second lip from the rotatable shaft by a distance in a radial direction.

A first surface, of the first lip, in contact with the rotatable shaft has a first inner diameter. A second surface, of the second lip, closest to the rotatable shaft in the radial direction has a second inner diameter, larger than the first inner diameter.

A fourth step involves rotating the rotatable shaft. A fifth step involves wearing away material forming the first lip and in contact with the rotatable shaft. A sixth step involves contacting the rotatable shaft with the second lip. A seventh step involves contacting the seal with a cage for the bearing assembly. The second lip is between the first lip and the cage.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:
1. A seal for a bearing assembly, comprising:
a longitudinal axis;
a first portion arranged to engage an outer ring for the bearing assembly; and,
a second portion extending radially inward and in a first axial direction from the first portion and including:
a first lip arranged to contact a rotatable shaft passing through the bearing assembly; and,
a second lip located past the first lip in a second axial direction, opposite the first axial direction, and arranged to be separated, in a radial direction, from the rotatable shaft by a first distance.

2. The seal of claim 1, wherein:
the first lip has a first diameter; and,
the second lip has a second diameter greater than the first diameter.

3. The seal of claim 1, further comprising:
a surface:
  connecting the first and second portions;
  forming a portion of the seal extending furthest in the second axial direction; and,
  arranged to contact a cage for the bearing assembly.

4. The seal of claim 1, wherein:
the first lip includes a first surface arranged to contact the rotatable shaft; and,
the second lip includes a second surface arranged to be closest to the rotatable shaft, the seal further comprising:
  a continuous surface including the first and second surfaces.

5. The seal of claim 4, wherein the continuous surface includes a third surface:
connecting the first and second surfaces; and,
radially outward of the first and second surfaces.

6. The seal of claim 1, further comprising:
a slot:
  axially between the first and second lips; and,
  opening in a radially inward direction.

7. The seal of claim 6, wherein a line parallel to the longitudinal axis passes through in sequence: the first lip, the slot and the second lip.

8. The seal of claim 1, further comprising:
a slot:
  radially between the first and second portions; and,
  opening in the first axial direction.

9. The seal of claim 8, wherein a line orthogonal to the axis and originating at the longitudinal axis passes through in sequence: the second portion, the slot and the first portion.

10. The seal of claim 1, wherein:
in a first state, the first lip is in contact with the rotatable shaft and the second lip is not in contact with the rotatable shaft; and,
in a second state, the first lip and the second lip are in contact with the rotatable shaft.

11. A bearing assembly, comprising:
an axis of rotation;
an outer ring;
a cage located within the outer ring;
a plurality of rolling elements axially retained by the cage and in contact with the outer ring; and,
a seal aligned with the cage in a first axial direction and including:
  a first portion in contact with the outer ring; and,
  a second portion extending radially inward and in a first axial direction from the first portion and including:
    a first lip arranged to contact a rotatable shaft; and,
    a second lip:
      arranged to be separated from the rotatable shaft in a radial direction; and,
      located past the first lip in a second axial direction, opposite the first axial direction.

12. The seal of claim 11, wherein:
the first lip has a first diameter; and,
the second lip has a second diameter greater than the first diameter.

13. The bearing assembly of claim 11, wherein:
the first lip includes a first surface arranged to contact the rotatable shaft;
the second lip includes a second surface arranged to be closest to the rotatable shaft; and,
the seal includes a continuous surface including the first and second surfaces.

14. The bearing assembly of claim 13, wherein the continuous surface includes a third surface:
connecting the first and second surfaces; and,
radially outward of the first and second surfaces.

15. The bearing assembly of claim 11, wherein the second portion includes a slot:
connecting the first and second lips; and,
opening in a radially inward direction.

16. The bearing assembly of claim 11, wherein the seal includes a slot:
radially between the first and second portions; and,
opening in the first axial direction.

* * * * *